Patented Dec. 1, 1925.

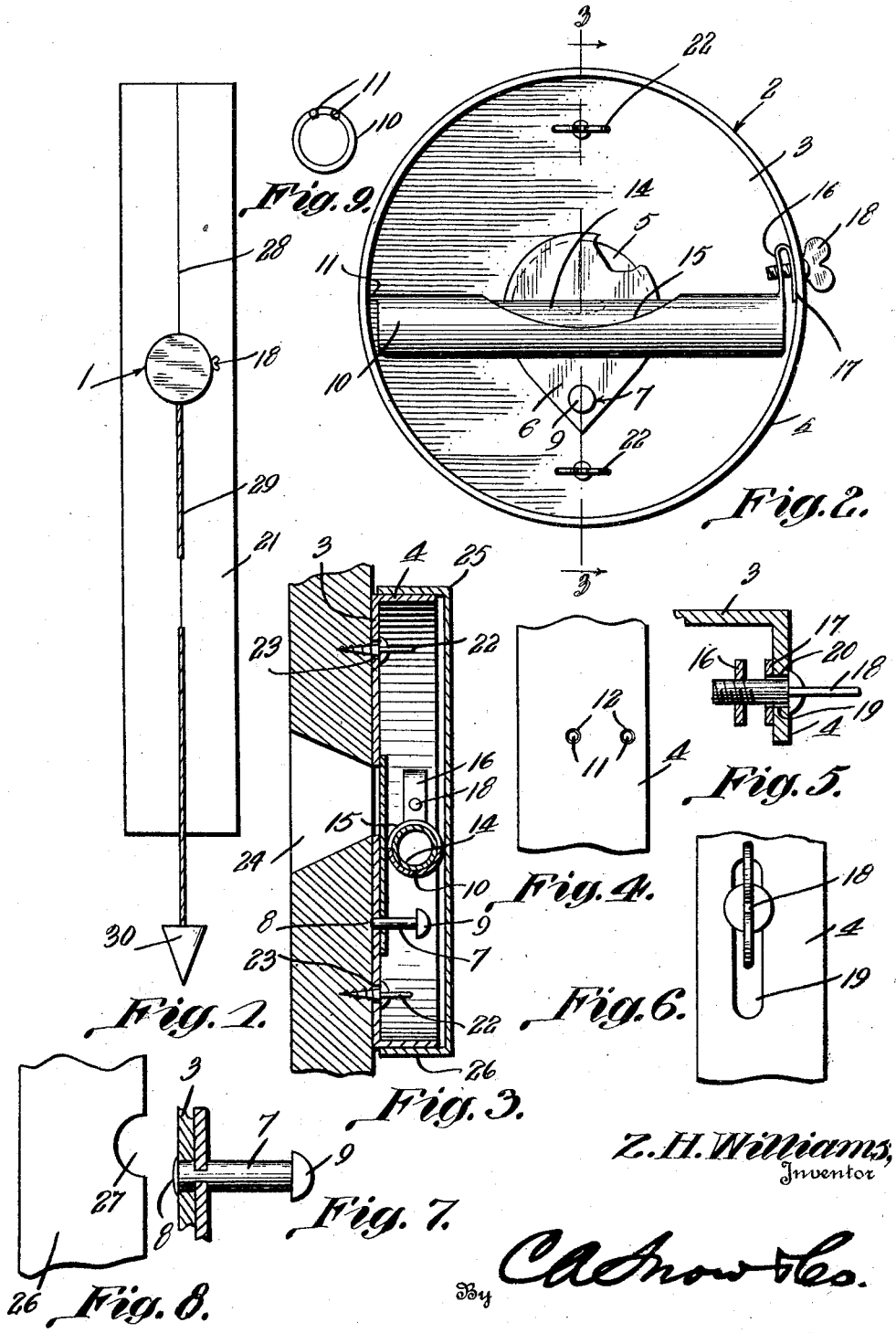

1,563,678

UNITED STATES PATENT OFFICE.

ZENAS H. WILLIAMS, OF SAN ANTONIO, TEXAS.

LEVEL DEVICE.

Application filed September 5, 1923. Serial No. 661,048.

*To all whom is may concern:*

Be it known that I, ZENAS H. WILLIAMS, a citizen of the United States, residing at San Antonio, in the county of Bexar and State of Texas, have invented a new and useful Level Device, of which the following is a specification.

This invention aims to provide a simple means whereby door jambs may be plumbed although the structure may be used for leveling. A further object is to provide a device of the class described which may be closed up readily and housed in a tool box when not in use. Another object of the invention is to provide novel means for adjusting the level vial.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in elevation, a device of the class described assembled with a straight edge; Figure 2 is an elevation wherein the cover has been removed; Figure 3 is a section on the line 3—3 of Figure 2; Figure 4 is a fragmental elevation showing a portion of the flange for the body of the casing; Figure 5 is a sectional detail illustrating the means whereby the level vial is held in adjusted positions; Figure 6 is an elevation of the structure shown in Figure 5; Figure 7 is a sectional view disclosing the means whereby the closure is controlled; Figure 8 is a fragmental elevation showing a portion of the rim of the cover; Figure 9 is an end elevation of the tubular carrier for the level vial.

In carrying out the invention there is provided a casing, of box-like form and denoted generally by the numeral 1, the casing preferably being circular in outline and being made of metal, ordinarily.

The casing 1 comprises a body 2 including a base 3 and an outstanding marginal flange 4 disposed approximately at right angles to the base 3. The base 3 of the body 2 has a central opening 5 of approximately semi-circular form. A closure 6 for the opening 5 is provided, the same being mounted to move parallel to the base 3 in frictional contact therewith the closure 6 being carried by a shaft 7 journaled on the base 3 of the body 2 and held therein for rotation, as indicated at 8. On the outer end of the shaft 7 there is a turning button 9 located within the body 2 of the casing 1 as clearly shown in Figure 3.

A tubular carrier 10 is located within the body 2 and is provided at one end with spaced fingers 11 received in openings 12 formed in the flange 4, the carrier thus being pivotally mounted at one end for swinging adjustment in a plane parallel to the base 3. Within the carrier 10, a level vial 14 is held, the carrier being cut away, as at 15 so that the bubble in the vial can be observed readily. The level vial 14 is disclosed through the tubular carrier 10 at a point closely adjacent to the opening 5 in the base 3 of the body 2.

That end of the tubular carrier 10 which is remote from the pivot fingers 11 is supplied with an upstanding arm 16 having a depending resilient finger 17 adapted to bear frictionally against the inner surface of the marginal flange 4. A holding device, such as a screw 18, is movable in a circumferential slot 19 formed in the flange 4 and passes through an opening 20 in the resilient finger 17, the screw being threaded into the arm 16.

A cover 25 for the body 2 is provided, the same having a marginal flange 26 within which the flange 4 of the body 2 is adapted to be received, as shown in Figure 3, the flange 26 being supplied with a notch 27, adapted to fit around the screw 18 when the cover is in place.

The device as hereinbefore described is adapted to be used in connection with a straight edge denoted generally by the numeral 21. There are apertures 23 in the base 3 of the body 2. A longitudinal mark 28 is made on the straight edge 21, the mark being parallel to the longitudinal edges of the member 21. The body 2 of the casing 1 is placed against the straight edge 21, the line 28 being visible through the apertures 23 in the base 3 of the body 2. Then, attaching elements 22, such as screws, are inserted through the apertures 23 in the base 3 into the straight edge 21, as shown in Figure 3, the device hereinbefore described thus being held upon the straight edge, with the carrier 10 and the vial 11 disposed approximately at right angles to the line 28. It is obvious that when one of the longitudinal edges of the member 21 is placed against the door jamp or other approximately vertical object the bubble in the vial 14 will indicate how nearly the said object approaches the vertical. If the tool is being operated in a dark place, rotation may be imparted to the shaft 7, whereupon the closure 6 will swing away from the opening 5 in the base 3 of the body 1 and light then will be shed on the level vial, through an opening 24 fashioned in the straight edge 21 and through the opening 5 which is formed in the base 3 of the body 2.

In order to adjust the tool, a cord or flexible element 29 is fastened at its upper end to the lowermost screw 22 and is provided at its lower end with a plumb bob 30. The cord 29 and the plumb bob 30 are merely to be used as reference means for adjusting the carrier. They show a step in the manufacture of an adjustable level. When the cord 29 coincides with the mark 28 on the straight edge 21, as shown in Figure 1, the operator is advised that the straight edge 21 is vertically disposed. Then, the carrier 10 may be adjusted until the level vial 14 is at right angles to the line 29. This adjustment may be brought about by slacking away the holding device or screw 18 so that the head of the screw no longer bears on the flange 4 on opposite sides of the slot 19. That end of the carrier 10 which is at the right in Figure 2 may be swung upwardly and downwardly, the fingers 11 forming a pivot. The spring finger 17, cooperating with the flange 4 of the body 2 holds the carrier 10 and the vial 14 at any position to which they have been adjusted, and after the desired adjustment has been made, the screw 18 may be advanced until its head bears against the flange 4 of the body 2 to hold the level vial permanently in its adjusted position, the screw 18 being threaded into the arm 16 of the carrier 10.

When the occasion for the use of the device has passed, the screws 22 may be removed, the cover 25 may be mounted on the body 2, and the entire device in simple box-like form may be stored in a tool box or in the pocket of the operator.

What is claimed is:

1. In a device of the class described, a casing comprising a base and a flange outstanding from the base, a carrier, means for mounting the carrier pivotally at one end on the flange, said carrier being supplied at its opposite end with an arm which is curved on itself to form a resilient finger bearing frictionally against the inner surface of the flange, a holding device adjustable in the arm and adapted to bear against the flange to hold the carrier against movement, the flange having an elongated slot for the reception of the holding device, and a vial mounted on the carrier.

2. In a device of the class described, a casing made up of a base and a detachable cover, the base and the cover having interfitting flanges, a level vial in the casing, means for mounting the vial for adjustment upon the base, said base having an opening exposing the intermediate portion of the vial, detachable means for securing the body to a straight edge or the like, said detachable means being adapted to be housed in the casing when not in use, and a closure for the opening, the closure being pivotally mounted on the base, the closure and the cover cooperating to retain said detachable means in the casing when said detachable means is not in use, and the cover serving to protect the vial.

In testimony that I claim the foregoing as my own, I have hereto affixed my signature.

ZENAS H. WILLIAMS.